United States Patent
Modi et al.

(10) Patent No.: US 11,361,346 B1
(45) Date of Patent: Jun. 14, 2022

(54) RETAIL AND ADVERTISING DOMAIN COLLABORATION

(71) Applicant: Amazon Technologies, Inc., Seattle, WA (US)

(72) Inventors: Ajay Modi, Seattle, WA (US); Jagadesh Babu Mudireddy, Redmond, WA (US); Robin Amit Trivedi, Thane (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/938,078

(22) Filed: Jul. 24, 2020

(51) Int. Cl.
  *G06Q 30/02* (2012.01)
  *G06Q 30/06* (2012.01)
  *G06F 21/62* (2013.01)

(52) U.S. Cl.
  CPC ..... *G06Q 30/0271* (2013.01); *G06F 21/6263* (2013.01); *G06Q 30/0255* (2013.01); *G06Q 30/0277* (2013.01); *G06Q 30/0643* (2013.01)

(58) Field of Classification Search
  CPC ...... G06Q 30/02–0277; G06Q 30/0643; G06F 21/6263
  See application file for complete search history.

(56) References Cited

U.S. PATENT DOCUMENTS

| 11,223,724 B2 * | 1/2022 | Nelson ................ H04M 3/5191 |
| 2012/0117455 A1 * | 5/2012 | Fogel ................. G06Q 10/0633 715/221 |

FOREIGN PATENT DOCUMENTS

| WO | WO-2010008397 A1 * | 1/2010 | ......... G06F 21/6263 |

OTHER PUBLICATIONS ip.com by Gupta "Emerging Phising Trends and Effectivness of the anti-Phising Landing page" Jun. 14, 2014, pp. 1-2 (Year: 2014).*

* cited by examiner

*Primary Examiner* — Raquel Alvarez
(74) *Attorney, Agent, or Firm* — Kilpatrick Townsend & Stockton LLP

(57) ABSTRACT

Described herein is a system and techniques for implementing a system that enables exchange of user information between retail and advertising domains while maintaining data security and privacy requirements. In some embodiments, a landing page is generated in response to a user interaction with a user interface element. The landing page is generated within the retail domain while the advertisement is in an advertising domain. The landing page, while in the retail domain, can access stored user information from the retail website and pre-fill forms of the landing page which a user can verify and submit to the advertising, thereby sharing the user information into the advertising domain.

20 Claims, 6 Drawing Sheets

RETAIL AND ADVERTISING DOMAIN COLLABORATION

BACKGROUND

In current electronic systems, data is increasingly being created, collected, and used for a variety of purposes. The internet has emerged as an important tool for communications. Data breaches and identity theft across the globe have caused governments across the world to strike back with more stringent data protection regulations, such as General Data Protection Regulation (GDPR) in the European Union (EU) and similar regulations in the works in the United States and other countries across the globe. In many instances, parties and entities handling data are required to comply with various policies, such as laws, regulations, technical or industry standards, business and contractual obligations, use or data subject-specific privacy or security obligations, and so on that also encumber the business uses of the internet.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include a system and methods by which user information available to a service provider may be auto-filled in a form and securely provided to an entity other than the service provider while maintaining strict privacy controls preventing the sharing of personal information without the consent of the user. In some embodiments, the advertiser may also be the service provider. In some embodiments, the user interacts with an user interface (UI) element of a network document (e.g., a website) that exists in an ecommerce domain. The user interaction causes the website to generate a landing page where user contact information can be gathered to share with the advertiser, the computing resources of the advertiser being in the advertising domain and therefore unable to directly access the user information which is stored in the ecommerce domain. Due to privacy and data regulations and controls, the advertising domain does not have access to any user information stored in the ecommerce domain. The landing page exists on the website, using a template provided by the advertiser. The website can autofill form entries on the landing page with user information such as contact information and demographic information because the ecommerce domain has access to the user information. The user can then selectively edit, as needed, the auto-filled information and confirm submission of the information to the advertiser, at which point the information entered onto the landing page is sent from the ecommerce domain to the advertising domain to be stored thereat.

By way of illustration, consider a scenario in which the system is implemented by an ecommerce retailer hosting advertising elements on their website. In this scenario, the advertising elements may be hosted by the website but do not have access to user information stored by the ecommerce website due to strict privacy and data controls, including, for example GDPR. The advertising elements are presented in a saveframe on the website such that the advertising element is in the advertising domain and the website is in an ecommerce domain. Though both may be visible to the user at the same time, the advertising domain does not have access to information stored outside of the saveframe. Due to this restriction on the sharing of data, advertising elements cannot access user information to share with advertisers or to autopopulate a submission form, thereby increasing friction for users to share information with advertisers they are interested in. Some advertising elements may gather contact information from users to follow up with product offerings, experiences, or other interactions with advertisers. In one scenario the advertising element may include an opportunity to schedule an in-person viewing of the advertised product. The advertiser therefore needs access to the user's contact information to schedule the in-person viewing or other interaction. Due to privacy controls, the advertiser cannot access such user information without specific consent from the user. The user may be less inclined to fill out contact information for a product if they have to manually fill in all the information and may instead be more inclined to submit their contact information if the process is seamless and requires little effort or input from the user. Providing auto population of forms in an entry page enables fast and simple user interactions that increase the speed and ease of providing user information to an advertiser. In the scenario, the user may click or select the advertising element which prompts the website hosting the advertising element to produce a landing page where user information can be entered and provided to the advertiser. The landing page is generated on the website within the domain of the retail space such that the landing page of the website has access to stored user information associated with the website and in particular with a user account associated with the website.

For example, the website may include user credentials to access a user account where location, contact information, demographic, and other user information is stored with respect to each registered user of the website. The user information in this domain is collected according to GDPR such that the user has full control over the collection and use of the user information. The user information can be auto populated onto the form of the landing page such that the user need only review their information before confirming permission to share the information with the advertiser and submitting the form of the landing page. Following the submission of the landing page, the user permission allows the submitted information to be shared outside of the retail domain and in particular to be shared with the advertiser in an advertising domain in a manner compliant with privacy and data security regulations.

The systems and techniques provided herein provide secure user information, such as user information stored in association with a website stored within a single domain and inaccessible for devices or entities from another domain. The systems and methods enable controllable sharing of the user information with a advertising domain while also remaining GDPR compliant. The sharing from the ecommerce domain to the advertising domain is enabled only in one direction, with no possibility for the advertising domain to add information to the ecommerce domain, in this manner, the user information is stored securely and cannot be corrupted. Additionally, the systems and techniques provided herein reduce a barrier between a user and an entity to enable faster and simpler sharing of user information when desired by the user in fewer steps or difficulty than conventional methods.

Figure 1:
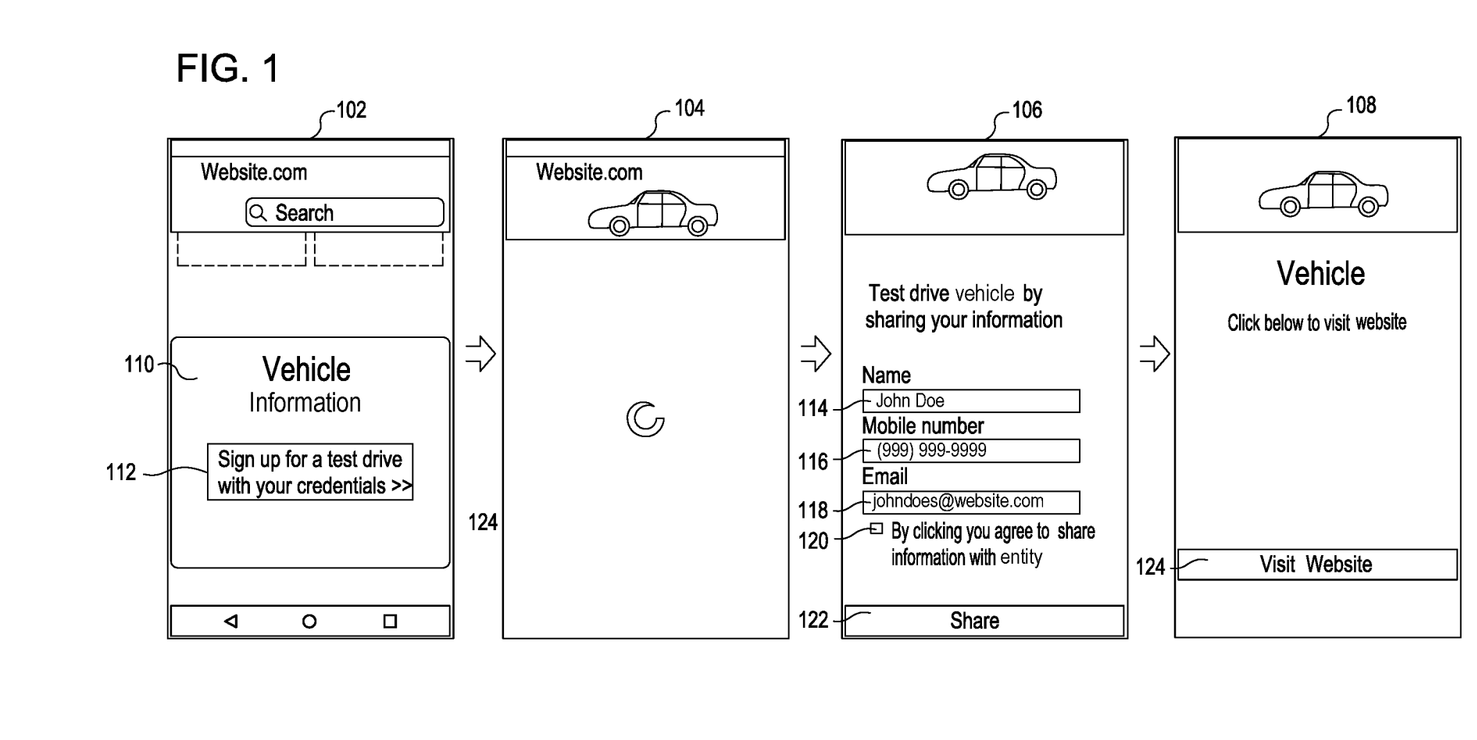
FIG. 1 depicts an example interaction that may occur when interacting with content via a graphical user interface in accordance with at least some embodiments described herein.

FIG. 1 depicts an example interaction that may occur when interacting with content via a graphical user interface (GUI) 102 in accordance with at least some embodiments described herein. In FIG. 1, the interaction is illustrated by means of information displayed by the GUI 102 at different points in time. In particular, FIG. 1 depicts information displayed by web browser where the GUI 102 presents a website of a service provider, although other computer applications and other types of network documents are possible. In some embodiments, the website may be generated and presented by a computing device of the service provider, including any computing device configured to host a webpage or network document.

In some embodiments, the website corresponds to an ecommerce storefront maintained by the service provider that maintains catalogs of items available for purchase through the storefront. The website includes pages for different features of the storefront such as product details and descriptions, different categories of products, and other such information. The website is hosted and exists within an ecommerce domain, such as a retail domain, such that the website is subject to regulations and requirements regarding customer data and privacy. The website also includes elements, such as content element 110, that are hosted on the website but exist within an advertising domain for purposes of privacy and data security regulations, the advertising domain not having access to user information stored in the ecommerce domain. The content element 110 may relate to products offered on the website or may relate to products offered by an entity other than the entity that hosts the website.

The ecommerce domain and the advertising domain include a set of computing resources (e.g., servers, data storage devices, etc.) that are isolated from one another and to which access is controlled. An entity does not have access to a domain unless the service provider provides it access credentials. The access credentials may originate with user permission to share access with the entity. The access to the domain, and the data contained therein, can be limited or restricted to remain in the single domain such that information stored in one domain cannot be accessed by entities outside the domain.

The content element 110 shows an advertisement for a vehicle with a button 112 providing an option to sign up for a test drive of the vehicle. Though the illustration is provided with respect to an advertisement for a vehicle and an opportunity to test drive the vehicle, the systems and methods can be used with content elements 110 of any variety for any product or service. The button 112 includes an indication that the option to sign up for a test drive can be accomplished using the user's credentials associated with the website. This may reduce a barrier that exists between the user and the entity by easing the speed and ease with which the user may respond to the advertisement, thereby increasing the likelihood of interacting with the entity.

The user may select the button 112 whereon the second GUI 104 is presented to the user. The second GUI 104 shows a view of the website during a transition between the website shown on GUI 102 and a landing page shown in the third GUI 106. The website shown in the second GUI 104 may indicate to a user that they have not been redirected away from the website the user was previously browsing, and may still include the name of the website at the top, in addition to an icon or other feature related to the content element 110 selected.

The third GUI 106 shows includes a landing page generated on the website. The landing page is part of the website and may be generated following a template or form provided by the entity. The landing page includes fillable entries 114, 116, and 118 for user information relating to the user such as a name, phone number, and email address. Depending on the content element 110 and the information requested or expected by the entity, the landing page shown in the third GUI can include additional fields for other user information such as physical address, demographic information, user preferences, and the like. Because the landing page is produced by the website, the landing page exists within the ecommerce domain. Within the ecommerce domain, the website has access to stored user information including contact information, such as required to fill in fillable entries 114, 116, and 118. Because the landing page has access to the stored user information within the ecommerce domain, the fillable entries 114, 116, and 118 can be prefilled based on the stored user information associated with the website. The fillable entries 114, 116, and 118 can also be edited by the user, for example to change an email address or phone number to a different address or phone number than is stored in association with the website.

Third GUI 106 also shows the website including a confirmation selection 120 as well as a submission button 122. The confirmation selection 120 informs the user that by selecting the confirmation they are agreeing to sharing their user information with the entity. This requirement can help satisfy regulations for data privacy by requiring the user to confirm that they wish to share their personal information with an entity. Upon user selection into the user device indicating selection of the submission button 122, the server sends the user information entered into the fillable entries 114, 116, and 118, via an interface (e.g., an application programming interface (API) or a web interface) to a computing resource of the entity for use and storage by the entity. In some embodiments, the user information may be encrypted, both while stored by the computing device hosting the website (such as through the use of an encryption technology such as key pair authentication) as well as when conveyed to the entity from the website (again through the use of an encryption technology such as key pair authentication). The user information is shareable from the ecommerce domain to the advertising domain while remaining compliant with various security and privacy regulations, including GDPR.

The fourth GUI 108 shows the website presented to the user following the submission of the user information on the website shown in the third GUI 106. The website shown in the fourth GUI 108 may include information related to the entity as well as a button 124 or link to proceed away from the website hosted by the service provider to a website hosted by the entity.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communications policy. In at least some embodiments, each component of the depicted architecture may represent one or more special purpose devices configured to perform the described functions. In some embodiments, each component of the depicted architecture may comprise a cluster or group of devices that each perform the same, or a similar, function.

Figure 2:
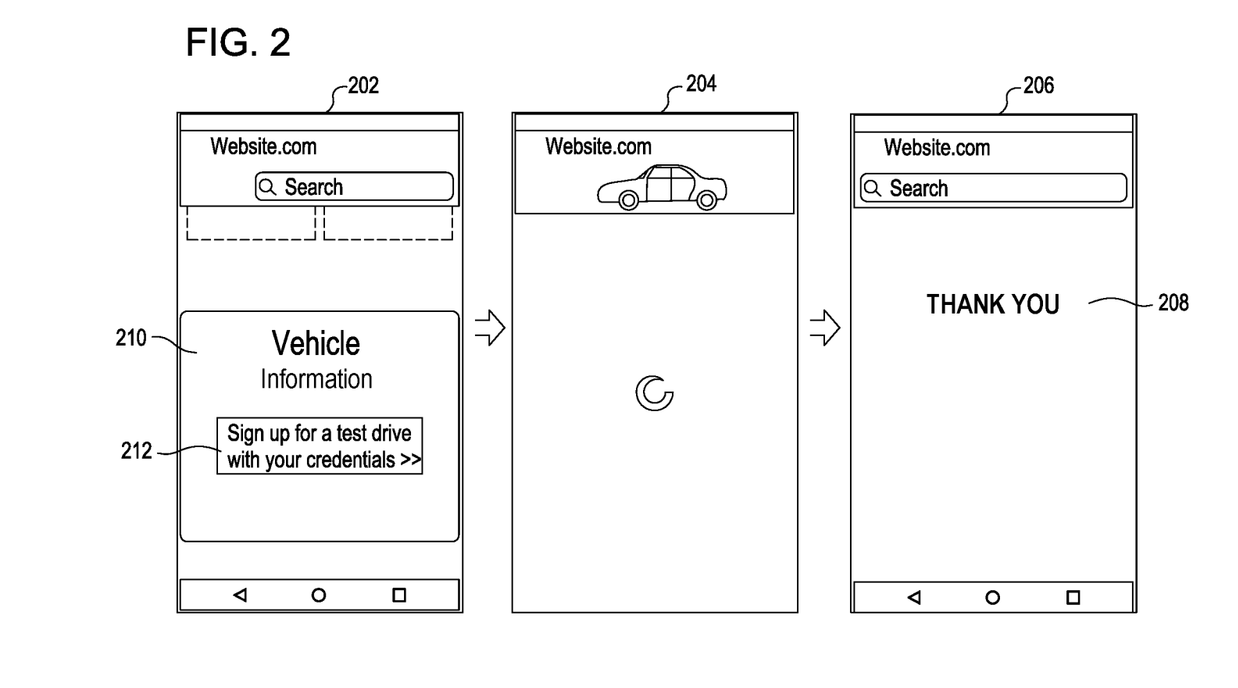
FIG. 2 depicts an example interaction that may occur when interacting with content via a graphical user interface after a previous interaction with the content has occurred in accordance with at least some embodiments described herein.

FIG. 2 depicts an example interaction that may occur when interacting with content via a GUI 202 after a previous interaction with the content has occurred, in accordance with at least some embodiments described herein. In FIG. 2, the interaction is illustrated by means of information displayed by a GUI 202 at different points in time. In particular, FIG. 2 depicts information displayed by a web browser where GUI 202 presents a website of a service provider, although other computer applications and other types of network documents are possible. In some embodiments, the website may be generated and presented by a computing device of the service provider, including any computing device configured to host a webpage or network document.

In some embodiments, the website corresponds to an ecommerce storefront maintained by the service provider that maintains catalogs of items available for purchase through the storefront. The website includes pages for different features of the storefront such as product details and descriptions, different categories of products, and other such information. The website is hosted and exists within an ecommerce domain, such as a retail domain, such that the website is subject to regulations and requirements regarding customer data and privacy. The website also includes elements, such as content element 210, that are hosted on the website but exist within an advertising domain for purposes of privacy and data security regulations, the advertising domain not having access to user information stored in the ecommerce domain. The content element 210 may relate to products offered on the website or may relate to products offered by an entity other than the entity that hosts the website, such as an advertiser. In some examples, the advertiser may also be the entity that hosts the website.

The content element 210 shows an advertisement for a vehicle with a button 212 providing an option to sign up for a test drive of the vehicle. Though the illustration is provided with respect to an advertisement for a vehicle and an opportunity to test drive the vehicle, the systems and methods can be used with content elements 110 of any variety for any product or service. The button 212 includes an indication that the option to sign up for a test drive can be accomplished using the user's credentials associated with the website. This may reduce a barrier that exists between the user and the entity by easing the speed and ease with which the user may respond to the advertisement, thereby increasing the likelihood of interacting with the entity.

In FIG. 2, the user may have already interacted with the content element 210 previously, such as according to the interaction described with respect to FIG. 1. In some embodiments, the user may have interacted with a different content element from the same entity related to a similar or identical product. The website hosting the content element 210 stores information related to the user interaction with the content element 210 and any previous interactions are likewise stored on a computing device of the service provider with respect to what content elements the user has interacted with. In the interaction shown in FIG. 2, the user has previously interacted with the content element 210 and provided their information to the entity, such as through the interaction described at FIG. 1.

After the user selects the button 212, the second GUI 204 shows a next page of the website presented to the user. The second GUI 204 shows a website page that provides a transition between the website shown in GUI 202 and the landing page shown in the third GUI 206. The website shown in the second GUI 204 may indicate to a user that they have not been redirected away from the website, and may still include the name of the website at the top, in addition to an icon or other feature related to the content element selected. While the website is presented on the second GUI 204 the website or a server or computing device associated therewith may be checking previous interactions of the user with the content element 210. If the user has interacted with the content element 210 previously then the website shown on the third GUI 206 is presented to the user with a message 208 indicating to the user that their previous interaction with the content element 210 has been recorded and no additional information is needed from the user.

For simplicity of illustration, a certain number of components are shown in FIG. 2. It is understood, however, that embodiments of the invention may include more than one of each component. In addition, some embodiments of the invention may include fewer than or greater than all of the components shown in FIG. 2. In addition, the components in FIG. 2 may communicate via any suitable communication medium (including the Internet), using any suitable communications policy. In at least some embodiments, each component of the depicted architecture may represent one or more special purpose devices configured to perform the described functions. In some embodiments, each component of the depicted architecture may comprise a cluster or group of devices that each perform the same, or a similar, function.

Figure 3:
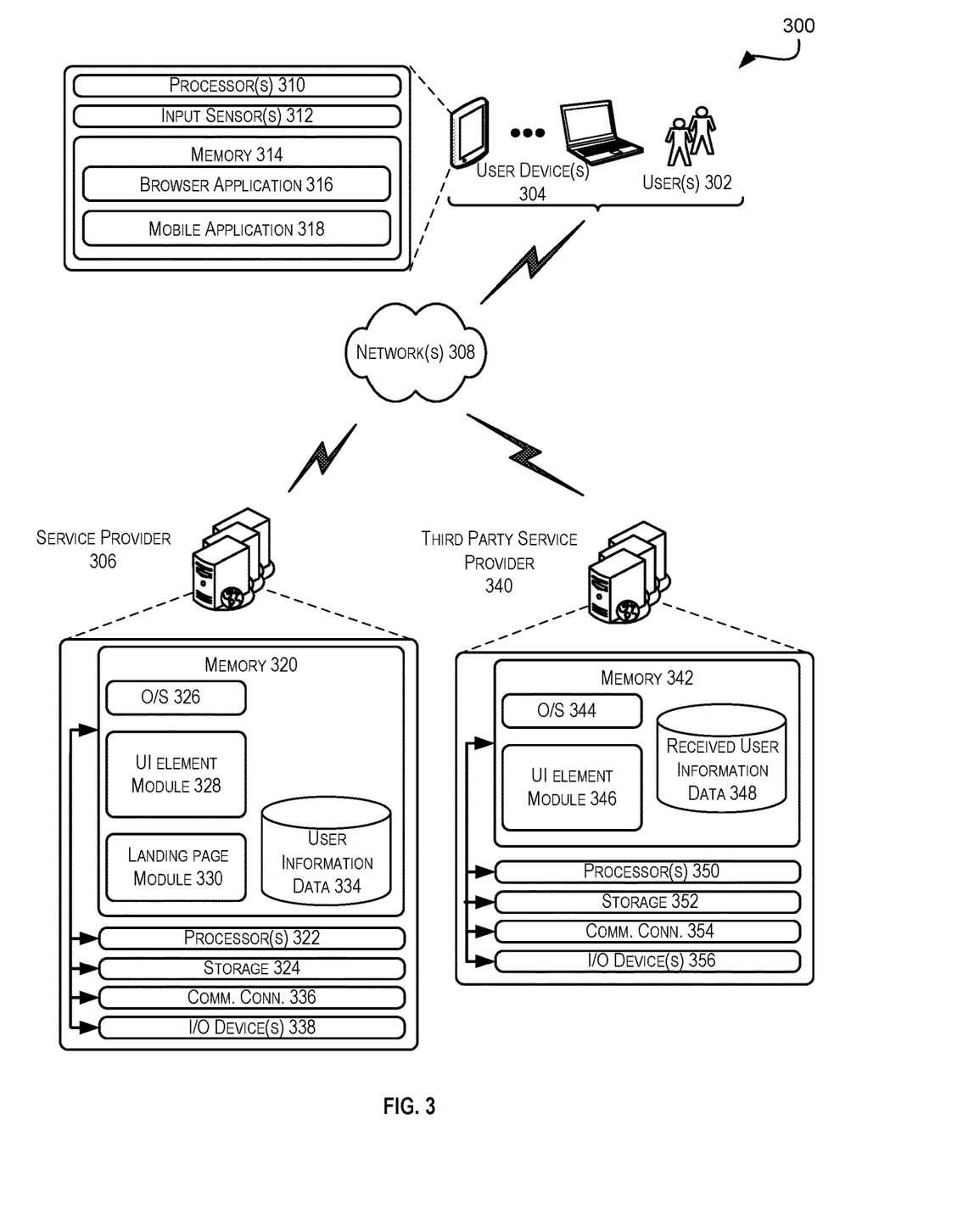
FIG. 3 depicts an illustrative example of a system or architecture in which techniques for interacting with advertisements in an ecommerce environment in accordance with at least some embodiments described herein.

FIG. 3 depicts an illustrative example of a system or architecture 300 in which techniques for interacting with advertisements in an ecommerce environment in accordance with at least some embodiments described herein. In architecture 300, one or more users 302 may utilize user device 304. In some examples, the user devices 304 may be in communication with one or more service providers 306 via the network(s) 308, or via other network connections.

User devices 304 may be any type of computing device such as, but not limited to, a mobile phone, a smart phone, a personal digital assistant (PDA), a laptop computer, a desktop computer, a server computer, a thin-client device, a tablet PC, etc. Additionally, user devices 304 may be any type of wearable technology device, such as a watch, earpiece, glasses, etc. The user device 304 may include one or more processors 310 capable of processing user input. The user device 304 may also include one or more input sensors 312 for receiving user input. As is known in the art, there are a variety of input sensors 312 capable of detecting user input, such as accelerometers, cameras, microphones, etc. The user input obtained by the input sensors 312 may be from a variety of data input types, including, but not limited to, audio data, visual data, or biometric data. Embodiments of the application on the user device 304 may be stored and executed from its memory 314.

Turning to the contents of the memory 314 in more detail, the memory 314 may include a browser application 316. In some embodiments, the memory 314 may also include a mobile application 318 that is capable of presenting information related to an online retailer and advertising to a user 302. Although architecture 300 depicts a mobile application 318 as being included in the contents of the memory 314 of the user device 304, at least a portion of the functionality described as being performed by the mobile application 318 may be performed by an entity external to the user device 304 (e.g., service provider 306 or third party service provider 340).

In some embodiments, the mobile application 318 may be configured to provide access to browse a website or network document of the service provider 306. In an example, the user may use the mobile application 318 to access the website and advertisements hosted thereon. It should be noted that some embodiments of the disclosure may not include a mobile application 318. For example, a user 302 may access a webpage using a browser application 316 and may be able to generate or edit the list of items and view the shopping cart previews received from the service provider 306 within that browser application 316.

In some examples, the network(s) 308 may include any one or a combination of many different types of networks, such as cable networks, the Internet, wireless networks, cellular networks, and other private and/or public networks. While the illustrated example represents the users 302 accessing the service providers 306 via browser application 316 over the network(s) 308, the described techniques may equally apply in instances where the users 302 interact with a service provider 206 via the user device 204 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

As described briefly above, the browser application 316 may allow the users 302 to interact with a service provider 306 and/or third-party websites, such as to access the storefront as well as advertisements as well as to store, access, and/or manage data, develop and/or deploy computer applications, and/or interact with web content. The one or more service providers 306, perhaps arranged in a cluster of servers or as a server farm, may be configured to host a website (or combination of websites) viewable via the user device 304 or accessible by a user device 304 via the browser application 316. Although depicted in memory of the user device 304 in this example, in some embodiments the browser application 316 may be hosted at a server. For example, the user device 304 may be a thin client device capable of accessing a browser application 316 remotely. The browser application 316 may be capable of handling requests from many users 302 and serving, in response, various user interfaces that can be rendered at the user device 304 such as, but not limited to, a web site. The browser application 316 may be any type of application or interface that supports user interaction with a website, such as social networking sites, electronic retailers, informational sites, blog sites, search engine sites, news and entertainment sites, and so forth. As discussed above, the described techniques can similarly be implemented outside of the browser application 316, such as with other applications running on the user device 304 (e.g., mobile application 318).

The service provider 306 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider 306 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment. The service provider 306 exists within an ecommerce domain, that is isolated from entities outside the ecommerce domain, such as third party service provider 340, such that data and user information stored in the ecommerce domain is restricted to access only by entities within the ecommerce domain. The third party service provider 340 does not have access to the ecommerce domain unless the service provider 306 provides it access credentials. The access credentials may originate with user permission to share access with the third party service provider 340. The third party service provider 340 exists within an advertising domain, the advertising domain different from the ecommerce domain and isolated such that the third party service provider 340 cannot access data from the ecommerce domain without credentials or permission granted through the service provider 306.

In one illustrative configuration, the service provider 306 may include at least one memory 320 and one or more processing units (or processor(s)) 322. The processor(s) 322 may be implemented as appropriate in hardware, computer-executable instructions, firmware or combinations thereof. Computer-executable instruction or firmware implementations of the processor(s) 322 may include computer-executable or machine executable instructions written in any suitable programming language to perform the various functions described.

The memory 320 may store program instructions that are loadable and executable on the processor(s) 322, as well as data generated during the execution of these programs. Depending on the configuration and type of service provider 306, the memory 320 may be volatile (such as random access memory (RAM)) and/or non-volatile (such as read-only memory (ROM), flash memory, etc.). The service provider 306 may also include additional storage 324, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 320 may include multiple different types of memory, such as static random access memory (SRAM), dynamic random access memory (DRAM) or ROM. Turning to the contents of the memory 320 in more detail, the memory 320 may include an operating system 326 and one or more application programs or services for implementing the features disclosed herein including at least a module for generating and presenting user interface (UI) elements including landing pages (UI element module 328 and landing page module 330). The memory 320 may also include user information data 334, which provides user information for a number of different users associated with the website and website profiles and other account-specific details. In some embodiments, the user information data 334 may be stored in a database.

The memory 320 and the additional storage 324, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 304 or the service provider 306. The service provider 306 may also contain communications connection(s) 336 that allow the service provider 306 to communicate with a stored database, another computing device or server, user terminals, and/or other devices on the network(s) 308. The service provider 306 may also include input/output (I/O) device(s) and/or ports 338, such as for enabling connection with a keyboard, a mouse, a pen, a voice input device, a touch input device, a display, speakers, a printer, etc.

Turning to the contents of the memory 320 in more detail, the memory 320 may include an operating system 326, a database containing user information data 334 and the one or more application programs or services for implementing the features disclosed herein, including a UI element module 328 and/or a landing page module 330.

In some embodiments, the UI element module 328 may be configured to, in conjunction with the processors 322, generate a UI for the storefront of the service provider 306 as well as other UI's for different aspects of the website of the service provider 306. The UI generated by the UI element module 328 may be one that users 302 can interact with through user device 304. In some embodiments, the UI element module 328 may generate multiple UI elements and spaces or locations within the web site for hosting advertisements from the third party service provider 340. Once generated, the user may click a button on the website to interact with various UI elements on the website.

In some embodiments, the landing page module 330 may be configured to, in conjunction with the processors 322, generate a landing page in response to a user 304 interacting with a UI element on the website. In some embodiments, the landing page module 330 may receive a request including information relating to which advertisement the user 302 interacted with. The landing page module 330 may generate the landing page based on a template or specification from the third party service provider 340. The template or specification from the third party service provider 340 may include fields that will be presented on the landing page for the user to fill in, such as a user name, contact information, demographic information, options related to an advertised product, and the like. The landing page module 330 may parse the template or list of fields to identify the number and identity of each field and generate a form including the requested number of fields.

The third party service provider 340, who is associated with the advertisement hosted on the website of the service provider 306 and may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the third party service provider 340 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the third party service provider 340 may include at least one memory 342 and one or more processing units (or processor(s)) 350. The processor(s) 350 may be implemented as appropriate in hardware, computer-executable instructions, firmware or combinations thereof. Computer-executable instruction or firmware implementations of the processor(s) 350 may include computer-executable or machine executable instructions written in any suitable programming language to perform the various functions described.

The memory 342 may store program instructions that are loadable and executable on the processor(s) 350, as well as data generated during the execution of these programs. Depending on the configuration and type of third party service provider 340, the memory 342 may be volatile (such as random access memory (RAM)) and/or non-volatile (such as read-only memory (ROM), flash memory, etc.). The third party service provider 340 may also include additional storage 352, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 342 may include multiple different types of memory, such as static random access memory (SRAM), dynamic random access memory (DRAM) or ROM.

Turning to the contents of the memory 342 in more detail, the memory 342 may include an operating system 344 and one or more application programs or services for implementing the features disclosed herein including at least a module for generating and presenting user interface (UI) elements including landing pages (UI element module 346). The memory 342 may also include received user information data 348, which provides user information received from users and other sources for a number of different users associated with the advertisements generated by the third party service provider 340. The third party service provider 340 may be an entity, a content provider, or an advertiser. In some embodiments, the received user information data 348 may be stored in a database.

The memory 342 and the additional storage 352, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 304 or the third party service provider 340. The third party service provider 340 may also contain communications connection(s) 354 that allow the third party service provider 340 to communicate with a stored database, another computing device or server, user terminals, and/or other devices on the network(s) 308. The third party service provider 340 may also include input/output (I/O) device(s) and/or ports 356, such as for enabling connection with a keyboard, a mouse, a pen, a voice input device, a touch input device, a display, speakers, a printer, etc.

Turning to the contents of the memory 342 in more detail, the memory 342 may include an operating system 344, a database containing received user information data 348 and the one or more application programs or services for implementing the features disclosed herein, including a UI element module 346.

In some embodiments, the UI element module 346 may be configured to, in conjunction with the processors 322, generate a UI for an advertisement and/or generate an advertisement to provide on a website of service provider 306. The advertisement generated by the UI element module 346 may be one that users 302 can interact with through user device 304. In some embodiments, the UI element module 346 may generate multiple advertisements or UI elements and convey the advertisements or UI elements over the network(s) to the service provider 306 either for the service provider 306 to provide on a website, or directly to a location on the website designated as an advertising domain.

Figure 4:
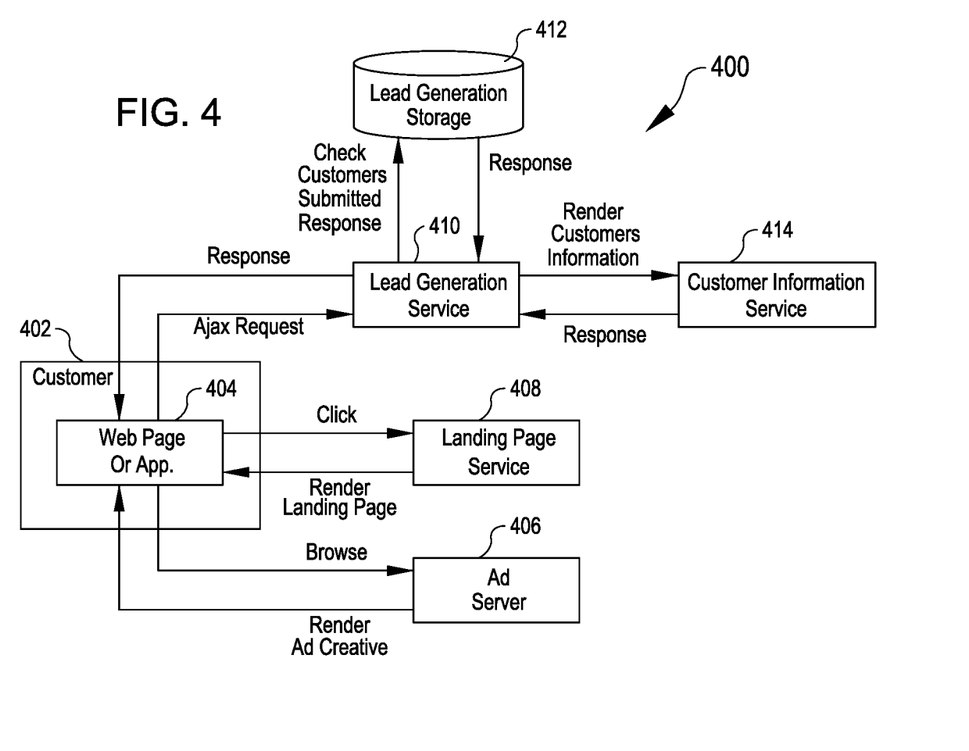
FIG. 4 depicts a system diagram demonstrating interactions that occur between elements of a system during interactions with content elements in accordance with at least some embodiments described herein.

FIG. 4 depicts a system diagram 400 demonstrating interactions that occur between elements of a system during interactions with content elements in accordance with at least some embodiments described herein. In the system diagram 400, a customer 402 is shown interacting with the system through a web page or application 404. The customer 402 interacts with the system through a user device, such as the user device 304 of FIG. 3. The service provider 306 receives the interactions from the customer 402 through the user device 304 and performs the operations depicted in the system diagram 400. In some embodiments, the operations performed as part of the system diagram 400 may be carried out by one or more other computing devices connected over network(s) 308.

The customer 402 initiates the flow of information on the system diagram 400 by browsing on the website of the service provider 306 and coming across a content element hosted and rendered by ad server 406. When the customer 402 clicks on the content element, an online proxy fleet (OPF) routes the request generated in response to the click of the customer 402 and the customer 402 is redirected to a landing page by the landing page service 408. Specifically, the OPF routes the requests from the content element to the landing page service 408.

The structure of the landing page is determined by the landing page service 408. The landing page service 408 provides information such as the template, form fillable fields, requested user information, and requested additional information. The landing page service 408 accomplishes this goal by rendering the landing page. The landing page service 408 in turn requests a landing page template from a landing page service (LPS) storage. The template information from the LPS storage and information such as the page title, description, and identification, all requested by the landing page service 408 and rendered the template information from the LPS storage in addition to the other data to generate a hypertext markup language (HTML) landing page and pass the HTML landing page to the OPF where it can be passed to the browser for display on the user device 304.

Before the user can view the HTML landing page, an ajax request is performed to request the user information for populating the fields of the landing page. The ajax request is routed, through the OPF to a lead generation service 410 for click to action ajax requests initiated from the landing page. The lead generation service 410 requests customer information from the customer information service 414.

The lead generation service 410 checks whether the customer 402 has already responded to the particular content element. A lead generation storage 412 stores customer information relating to customers 402 who responded or interacted with the content element. In particular, the lead generation storage 412 uses a user identifier or session identifier in addition to a marketplace identifier and landing page uniform resource locator (URL) to identify whether the user has responded. The user identifier and marketplace identifier and landing page URL can be stored for each response of a user such that subsequent uses by the same user identifier will match the previous information. In the event the customer 402 has already responded to the content element, the response status will be set such that the lead generation service will cause the landing page to render as a "thank you" page without rendering the form for the landing page. In the event the customer 402 has not yet responded to the content element, the lead generation service 410 will convey a status causing the landing page to render based on the landing page service 408.

In the event the user has not responded to the content element, the lead generation service 410 will request user information, such as user contact information, from the customer information service 414. The customer information may then be encrypted by a master key. In some embodiments, the customer information may be stored in an encrypted database, or stored in an encrypted state and be decrypted prior to returning the user information to the lead generation service 410. The response from the lead generation service 410 may be returned in a data format such as JavaScript Object Notation (JSON) or any other suitable data format. The lead generation service 410 may append a token and pass the request over to the OPF. The OPF will then route the response to the landing page at the web page or application 404 after decrypting where the forms of the landing page can be filled in with the customer information.

Figure 5:
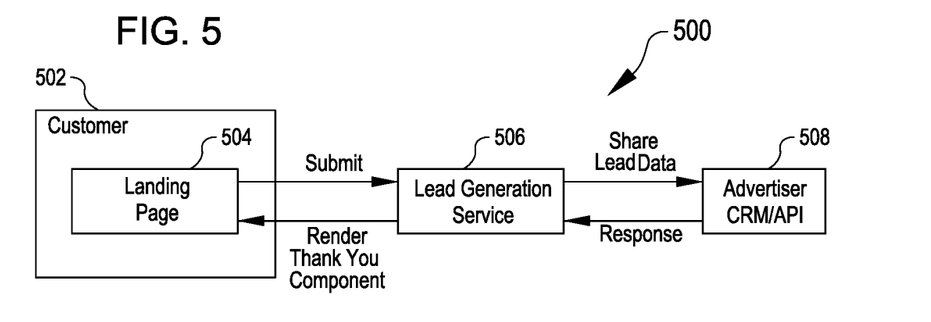
FIG. 5 depicts a system diagram demonstrating interactions that occur between elements of a system during interactions with content elements in an ecommerce environment in accordance with at least some embodiments described herein.

FIG. 5 depicts a system diagram 500 demonstrating interactions that occur between elements of a system during interactions with content elements in accordance with at least some embodiments described herein. In the system diagram 500, a customer 502 is shown interacting with the system. The customer 502 interacts with the system through a user device, such as the user device 304 of FIG. 3. The service provider 306 receives the interactions from the customer 502 through the user device 304 and performs the operations depicted in the system diagram 500. In some embodiments, the operations performed as part of the system diagram 500 may be carried out by one or more other computing devices connected over network(s) 308.

The customer 502 initiates flow chart 500 by submitting a landing page 504, such as by selecting or confirming a select button on a landing page 504, such as the landing page described with respect to FIG. 4. When the customer 502 clicks or submits the landing page, the OPF routes the request to a lead generation service 506.

The lead generation service 506 shares the landing page information, including the customer information to an advertiser customer relationship management (CRM) application programming interface (API) 508. The API provides a computing interface to enable interactions between intermediaries. The customer information is shared with the advertiser and a response indicating the advertiser has received the customer information to the lead generation service 506. The lead generation service 506 then renders a thank you page to the customer on the browser, the thank you page indicating to the customer that the customer information has been submitted to the advertiser.

In the event the customer 502 has previously shared their customer information with the advertiser, the lead generation service may identify that the customer 502 has previously submitted their information through the landing page, such as described above with respect to FIG. 4 above. In such a case, the lead generation service 506 may not share the customer information with the advertiser but may instead render the thank you page at the browser. In some examples, the thank you page in such circumstances may indicate that the customer information has been previously submitted to the advertiser and has therefore not been resubmitted to the advertiser.

Figure 6:
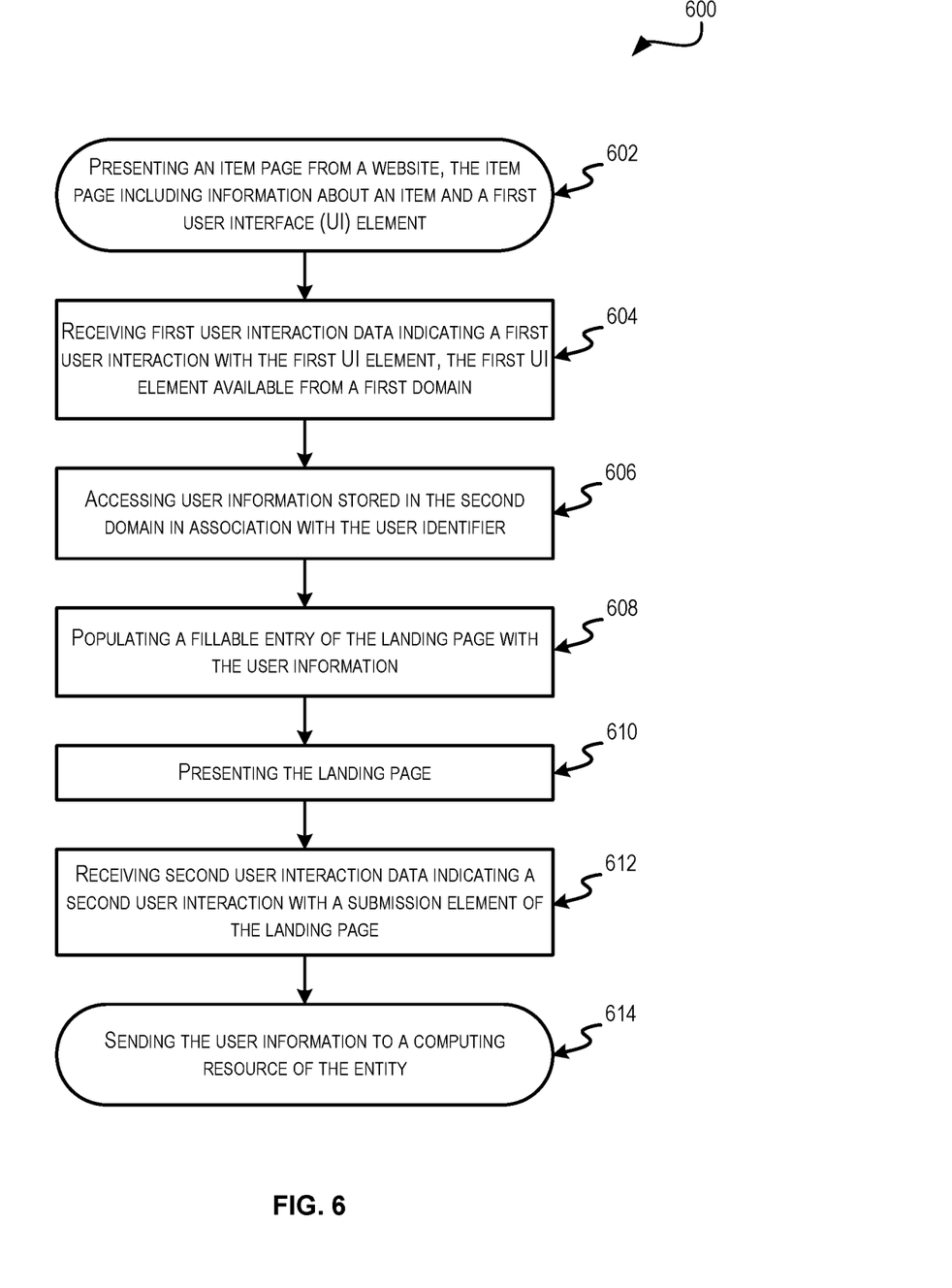
FIG. 6 illustrates a flow diagram illustrating an example process for providing user contact information through interaction with a content element in accordance with at least some embodiments described herein.

FIG. 6 illustrates a flow diagram illustrating an example process 600 for providing user contact information through interaction with a content element in accordance with at least some embodiments described herein. Some or all of the process 600 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the process 600 may be performed by or under the control of the service provider 306 of FIG. 3.

Process 600 may begin at 602, when a computing device associated with service provider 306 presents an item page from a web site, the item page including information about an item and a first user interface (UI) element. The information about an item may correspond to information related to a purchase or sale of the item. The first UI element may include a content element provided or sourced from a third party service provider 340. The item page for the website may include an item page of an ecommerce storefront for the purchase or sale of items from the service provider with the content element including an advertisement on the website page.

At 604, the process 600 may include receiving first user interaction data indicating a first user interaction with the first UI element, the first UI element available from an advertising domain. The advertising domain is associated with an entity other than the service provider of the website, such as an advertiser including the third party service provider 340. The first user interaction may include a click, selection, or other such user input through a user device to indicate a selection of the first UI element. The advertising domain may include a saveframe hosting the first UI element that is an advertising element in an advertising domain located on a website. The advertising domain does not have access to data and information, such as user information, from the domain of the website, which may be an ecommerce domain.

At 606, the process 600 may include accessing user information stored in an ecommerce domain in association with a user identifier. The user information may include contact information, personal information, demographic information, location information, and various user specific preferences. The user identifier may include user credentials, a user ID, or any user identifier capable of identifying the user of the website. In some embodiments, the user identifier may include login information such as a username associated with an account that includes the user information.

At 608, the process 600 may include populating a fillable entry of a landing page with the user information. The landing page is generated in response to the first user interaction data and includes one or more entry forms for inputting user information. The fillable entries may be determined based on a template or list of requirements provided by the third party service provider.

At 610, the process 600 may include presenting the landing page. The landing page is presented on the website, as a page or element of a page on the website. The landing page is contained within the ecommerce domain such that it has access to the user information associated with the user identifier. The landing page may be presented based at least in part on the first user interaction data, for example when the first user interaction data includes a user selection of a UI element of a content element indicating they would like to contact or provide their information to an entity.

At 612, the process 600 may include receiving second user interaction indicating a second user interaction with a submission element of the landing page. The landing page may include a share confirmation selection that must be selected or approved by a user prior to enabling or allowing submission of the user information. The second user interaction may also include additional inputs or editing of the user information on the landing page.

At 614, the process 600 may include sending the user information to a computing resource of the entity (i.e., the third party service provider). The user information may be encrypted, for example using key pair encryption or other known encryption methods before sending. Sending the user information to the entity also includes sending the user information, which was previously only stored in the ecommerce domain, to the advertising domain where it is accessible by the third party service provider such as an entity.

Figure 7:
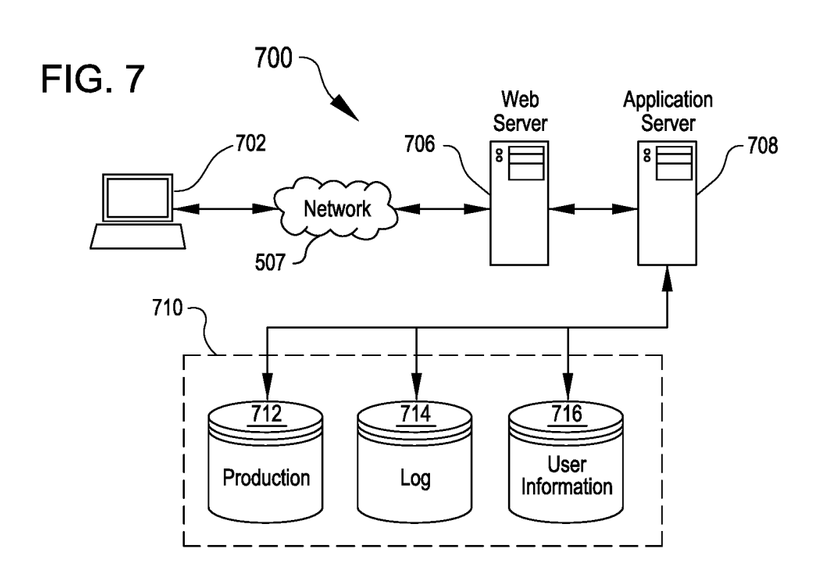
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language (HTML), Extensible Markup Language (XML), or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
presenting an item page from a website that exists in an ecommerce domain of a service provider, the item page including: (I) item information about an item and (II) a first user interface (UI) element available from an advertising domain of an advertiser, the ecommerce domain storing user information that is inaccessible to a computing resource of the advertising domain, and the first user interface element prevented from presenting the user information;

receiving first user interaction data indicating a first user interaction with the first UI element;

accessing, based at least in part on a user identifier associated with the first user interaction data, the user information stored in the ecommerce domain in association with the user identifier;

populating a fillable entry of a landing page of the website with the user information, the landing page available from the ecommerce domain;

presenting, based at least in part on the first user interaction data, the landing page;

receiving second user interaction data indicating a second user interaction with a submission element of the landing page, the second user interaction indicating a confirmation of the user information; and sending, based at least in part on the second user interaction data, the user information to the computing resource.

2. The computer-implemented method of claim 1, further comprising:

storing interaction data in the ecommerce domain describing the user information sent to the computing resource;

receiving third user interaction data indicating a third user interaction with the first UI element;

determining the user information was previously sent to the computing resource based on the interaction data; and presenting, in response to determining the user information was previously sent to the computing resource, a submission confirmation page of the website describing that the user information was previously submitted.

3. The computer-implemented method of claim 1, wherein the ecommerce domain comprises a set of user information and sending the user information comprises sending a subset of the set of user information, the subset of the set of user information comprising the fillable entry of the landing page.

4. The computer-implemented method of claim 1, wherein the user information stored in the ecommerce domain is encrypted with a public key of the service provider associated with the website, wherein accessing the user information stored in the ecommerce domain comprises decrypting the user information with a private key of the service provider, and wherein the user information is encrypted with a public key of the advertiser before sending the user information to the computing resource of the advertiser.

5. A computer-implemented method, comprising:

receiving first user interaction data indicating a first user interaction with a first user interface (UI) element presented within a page of a website, the first UI element available from an advertising domain that is associated with an advertiser, the website existing in an ecommerce domain of a service provider, the ecommerce domain storing user information that is inaccessible to a computing resource of the advertising domain, and the first user interface element prevented from presenting the user information on the page;

accessing, based at least in part on a user identifier associated with the first user interaction data, the user information stored in the ecommerce domain in association with the user identifier;

populating a fillable entry of a page of the website with the user information, the page available from the ecommerce domain;

presenting, based at least in part on the first user interaction data, the page;

receiving second user interaction data indicating a second user interaction with a second UI element of the page, the second user interaction indicating a confirmation of the user information; and sending, based at least in part on the second user interaction data, the user information to the computing resource of the advertiser.

6. The computer-implemented method of claim 5, wherein:

presenting the page comprises switching from the advertising domain to the ecommerce domain; and sending the user information comprises switching from the ecommerce domain to the advertising domain.

7. The computer-implemented method of claim 6, wherein the ecommerce domain includes a data store that stores the user information and the advertising domain does not include access to the user information until the user information is sent to the computing resource.

8. The computer-implemented method of claim 5, wherein accessing the user information comprises:

determining website credentials based on user access to the website;

retrieve, from a data store, the user information based on the website credentials.

9. The computer-implemented method of claim 5, further comprising:

receiving third user interaction data after populating the fillable entry, the third user interaction data comprising changes to the user information in the fillable entry; and storing the changes to the user information in the advertising domain and not the ecommerce domain.

10. The computer-implemented method of claim 5, further comprising receiving third user interaction data after populating the fillable entry, the third user interaction data comprising additional user information entered by a user; and storing the additional user information in the advertising domain.

11. The computer-implemented method of claim 10, wherein the third user interaction data comprises additional user contact information received from a device of the user.

12. The computer-implemented method of claim 5, further comprising:

storing interaction data in the ecommerce domain describing the user information sent to the computing resource;

receiving third user interaction data indicating a third user interaction with the first UI element;

determining the user information was previously sent to the computing resource based on the interaction data; and presenting, in response to determining the user information was previously sent to the computing resource, a submission confirmation page of the website describing that the user information was previously submitted.

13. The computer-implemented method of claim 5, wherein the user information stored in the ecommerce domain is encrypted with a public key of the service provider associated with the website, accessing the user information stored in the ecommerce domain comprises decrypting the user information with a private key of the service provider, and wherein the user information is encrypted with a public key of the advertiser before sending the user information to the computing resource of the advertiser.

14. A system comprising:

a processor; and a memory including instructions that, when executed by the processor, cause the system to:

receive first user interaction data indicating a first user interaction with a first user interface (UI) element presented within a page of a website, the first UI element available from an advertising domain that is associated with an advertiser, the website existing in an ecommerce domain of a service provider, the ecommerce domain storing user information that is inaccessible to a computing resource of the advertising domain, and the first user interface element prevented from presenting the user information on the page;

access, based at least in part on a user identifier associated with the first user interaction data, the user information stored in the ecommerce domain in association with the user identifier;

populate a fillable entry of a page of the website with the user information, the page available from the ecommerce domain;

present, based at least in part on the first user interaction data, the page;

receive second user interaction data indicating a second user interaction with a second UI element of the page, the second user interaction indicating a confirmation of the user information; and send, based at least in part on the second user interaction data, the user information to the computing resource of the advertiser.

15. The system of claim 14, wherein the memory stores further instructions that, when executed by the processor, cause the system to additionally:

store interaction data in the ecommerce domain describing the user information sent to the computing resource;

receive third user interaction data indicating a third user interaction with the first UI element;

determine the user information was previously sent to the computing resource based on the interaction data; and present, in response to determining the user information was previously sent to the computing resource, a submission confirmation page of the website describing that the user information was previously submitted.

16. The system of claim 14, wherein the fillable entry of the page comprises a template of information requested by the advertiser.

17. The system of claim 14, wherein the memory stores further instructions that, when executed by the processor, cause the system to additionally encrypt the user information before sending to the computing resource of the advertiser.

18. The system of claim 14, wherein the memory stores further instructions that, when executed by the processor, cause the system to additionally store the user information at a computing resource within the ecommerce domain.

19. The system of claim 14, wherein accessing the user information comprises accessing the user information based on user credentials associated with the website.

20. The system of claim 14, wherein the ecommerce domain includes access to the user information and the advertising domain does not include access to the user information.

* * * * *